United States Patent
Sugiyama (10) Patent No.: US 9,583,131 B1
(45) Date of Patent: Feb. 28, 2017

(54) MAGNETIC DISK DEVICE AND CONTROL METHOD

(71) Applicant: Kabushiki Kaisha Toshiba, Minato-ku, Tokyo (JP)

(72) Inventor: Hiroshi Sugiyama, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/062,598

(22) Filed: Mar. 7, 2016

Related U.S. Application Data (60) Provisional application No. 62/260,702, filed on Nov. 30, 2015.

(51) Int. Cl.
G11B 19/04 (2006.01)
G11B 5/596 (2006.01)

(52) U.S. Cl.
CPC ........ G11B 19/048 (2013.01); G11B 5/59627 (2013.01); G11B 19/041 (2013.01)

(58) Field of Classification Search
CPC ... G11B 5/59627; G11B 19/04–19/041; G11B 19/045; G11B 19/048
USPC ............................ 360/31, 48, 55, 60, 69, 75
See application file for complete search history.

(56) References Cited

U.S. PATENT DOCUMENTS

| | | | |
|---|---|---|---|
| 7,242,551 B2 * | 7/2007 | Kurihara | G11B 5/59633 360/75 |
| 8,203,800 B2 | 6/2012 | Li et al. | |
| 8,638,513 B1 * | 1/2014 | Burd | G11B 5/012 360/39 |
| 8,854,752 B2 * | 10/2014 | Jin | G11B 19/045 360/31 |
| 8,867,153 B1 * | 10/2014 | Coker | G11B 5/012 360/31 |
| 8,873,178 B2 * | 10/2014 | Erden | G11B 20/1217 360/39 |
| 8,902,536 B1 * | 12/2014 | Hwang | G11B 5/59627 360/75 |
| 8,922,947 B2 | 12/2014 | Erden et al. | |
| 8,970,980 B1 * | 3/2015 | Dhanda | G11B 5/59688 360/75 |
| 8,988,812 B1 * | 3/2015 | Brunnett | G11B 5/3964 360/75 |
| 9,093,119 B1 * | 7/2015 | Hwang | G11B 20/20 |

(Continued)

FOREIGN PATENT DOCUMENTS

| JP | 2012-048800 A | 3/2012 |
|---|---|---|
| JP | 2013-232271 A | 11/2013 |

*Primary Examiner* — Wayne Young
*Assistant Examiner* — James L Habermehl
(74) *Attorney, Agent, or Firm* — White & Case LLP (57) ABSTRACT

According to one embodiment, there is provided a magnetic disk device including a magnetic disk, a magnetic head, and a controller. The magnetic head is opposite the magnetic disk. The magnetic head includes a first read head and a second read head. The controller determines a track pitch in the vicinity of a first track or a second track adjacent to the first track of the magnetic disk based on first position information and second position information. The first position information depends on a servo signal read by the first read head and corresponds to the first track. The second position information depends on a servo signal read by the second read head and corresponds to the second track.

20 Claims, 8 Drawing Sheets

(56) References Cited

U.S. PATENT DOCUMENTS

| | | | | |
|---|---|---|---|---|
| 9,147,417 B1 * | 9/2015 | Wilson | ................ | G11B 5/4886 |
| 9,147,419 B2 * | 9/2015 | Oberg | ................ | G11B 5/59627 |
| 9,245,560 B1 * | 1/2016 | Nie | .................... | G11B 5/59666 |
| 9,305,596 B2 * | 4/2016 | Trantham | .............. | G11B 20/182 |
| 9,311,937 B2 * | 4/2016 | Zou | ........................ | G11B 5/455 |
| 9,384,767 B2 * | 7/2016 | Oberg | ................ | G11B 5/59627 |
| 9,401,167 B2 * | 7/2016 | Pokharel | ............ | G11B 5/59627 |

* cited by examiner

| ZONE NO. | REPRESENTATIVE TRACK NO. (ZONE START) | REFERENCE INTER-HEAD DISTANCE |
|---|---|---|
| 0 | 0 | REFERENCE INTER-HEAD DISTANCE [zone0] |
| 1 | k | REFERENCE INTER-HEAD DISTANCE [zone1] |
| 2 | 2k | REFERENCE INTER-HEAD DISTANCE [zone2] |
| 3 | 3k | REFERENCE INTER-HEAD DISTANCE [zone3] |
| ... | ... | ... |
| ... | ... | ... |
| N | Nk | REFERENCE INTER-HEAD DISTANCE [zoneN] |
| N+1 | (N+1)k | REFERENCE INTER-HEAD DISTANCE [zone(N+1)] |

MAGNETIC DISK DEVICE AND CONTROL METHOD

CROSS-REFERENCE TO RELATED APPLICATIONS

This application is based upon and claims the benefit of priority from U.S. Provisional Application No. 62/260,702, filed on Nov. 30, 2015; the entire contents of which are incorporated herein by reference.

FIELD

Embodiments described herein relate generally to a magnetic disk device and a control method.

BACKGROUND

In magnetic disk devices, in order to increase a density of data to be recorded on a magnetic disk, a track pitch of the magnetic disk tends toward becoming narrower. It is desired to manage track-pitch irregularities (places different in track pitch from their neighborhoods).

DETAILED DESCRIPTION

In general, according to one embodiment, there is provided a magnetic disk device including a magnetic disk, a magnetic head, and a controller. The magnetic head is opposite the magnetic disk. The magnetic head includes a first read head and a second read head. The controller determines a track pitch in the vicinity of a first track or a second track adjacent to the first track of the magnetic disk based on first position information and second position information. The first position information depends on a servo signal read by the first read head and corresponds to the first track. The second position information depends on a servo signal read by the second read head and corresponds to the second track.

Exemplary embodiments of a magnetic disk device will be explained below in detail with reference to the accompanying drawings. The present invention is not limited to the following embodiments.

Embodiment

Figure 1:
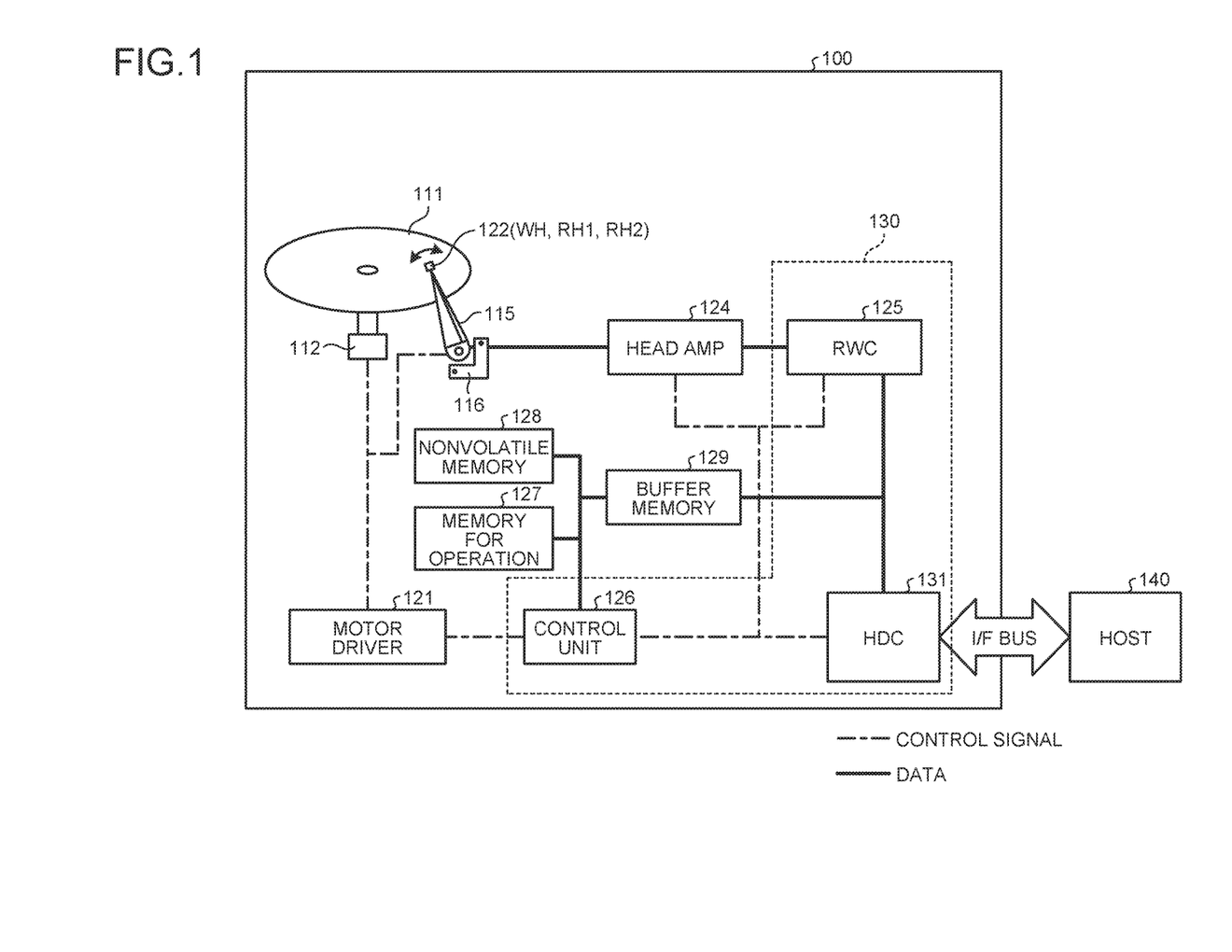
FIG. 1 is a diagram showing a configuration of a magnetic disk device according to an embodiment.

A magnetic disk device 100 according to the embodiment will be described using FIG. 1. FIG. 1 is a diagram showing a configuration of the magnetic disk device 100.

The magnetic disk device 100 is a device which records information, for example, onto a magnetic disk 111 via a magnetic head 122 and reads a signal from the magnetic disk 111 via the magnetic head 122 (such as a hard disk device, an HDD). Specifically, the magnetic disk device 100 comprises the magnetic disk 111, a spindle motor (SPM) 112, a motor driver 121, the magnetic head 122, an actuator arm 115, a voice coil motor (VCM) 116, a head amplifier 124, a read write channel (RWC) 125, a hard disk controller (HDC) 131, a buffer memory 129, and a control unit 126.

The magnetic disk 111 is rotated by the SPM 112 with a rotation axis as the center at predetermined rotation speed. The SPM 112 is rotationally driven by the motor driver 121.

The magnetic head 122, being opposite the magnetic disk 111, writes and reads data onto and from the magnetic disk 111 by a write head WH and read heads RH1, RH2 provided therein. The two read heads RH1, RH2 are used, for example, as a master head and a slave head in a two-dimensional magnetic recording (TDMR) technique. For example, the master head is a read head for reading data, and one of the read heads RH1, RH2 is used as it. For example, the slave head is a read head for reading a signal used in reducing inter-track interference (ITI) when reading data, and the other of the read heads RH1, RH2 is used as it. The magnetic head 122 is located at a tip of the actuator arm 115 and moved by the VCM 116 driven by the motor driver 121 along a radial direction (cross-track direction) of the magnetic disk 111.

The head amplifier 124 amplifies the signal read by the magnetic head 122 from the magnetic disk 111 to output and supply the amplified signal to the RWC 125. Further, the head amplifier 124 supplies the magnetic head 122 with a write current based on a signal supplied from the RWC 125 to write data onto the magnetic disk 111.

The HDC 131 performs control of transmission/reception of data to/from a host 140 via an I/F bus, control of the buffer memory 129, data error correction on write data to be recorded on the magnetic disk 111, and the like. The buffer memory 129 is used as a cache for data which is to be transmitted to or has been received from the host 140. Further, the buffer memory 129 is used to temporarily store data read from the magnetic disk 111, data to be written onto the magnetic disk 111, or control firmware read from the magnetic disk 111, and so on. The buffer memory 129 is, for example, a DRAM or SDRAM.

The RWC 25 code modulates data to be written onto the magnetic disk 111 supplied from the HDC 131 to supply to the head amplifier 124. Further, the RWC 125 code demodulates a signal read from the magnetic disk 111 and supplied via the head amplifier 124 into digital data to output to the HDC 131.

A memory 127 for operation (e.g., an SRAM: Static Random Access Memory), a nonvolatile memory 128 (e.g., a Flash ROM: Flash Read Only Memory), and a buffer memory 129 for temporary storage are connected to the control unit 126. The control unit 126 controls the magnetic disk device 100 overall according to firmware stored in the nonvolatile memory 128 or the magnetic disk 111. The firmware includes initial firmware to be executed first at the startup of the magnetic disk device 100 and control firmware used for usual operation of the magnetic disk device 100. The initial firmware is stored in, e.g., the nonvolatile memory 128, and the control firmware may be recorded on the magnetic disk 111. The control firmware is, by control according to the initial firmware, read from the magnetic disk 111 into the buffer memory 129 for temporary storage and then stored into the memory 127 for operation.

Note that the hardware configuration including the RWC 125, control unit 126, and HDC 131 may be regarded as a controller 130.

In the magnetic disk device 100, track numbers are assigned to a plurality of concentric circle-shaped tracks provided on the magnetic disk 111 in the order of from inner to outer or from outer to inner. In the magnetic disk device 100, a variety of management information using the track numbers can be recorded on a management information recording area of the magnetic disk 111. In this specification, let Trk_x denote a track having a track number of x, where x is any natural number. The case where track numbers are assigned in the order of from the outer to the inner side of the magnetic disk 111 will be illustrated below.

In the magnetic disk device 100, in order to make the density of data stored on the magnetic disk 111 higher, the track pitch of the magnetic disk 111 tends toward becoming narrower. As the track pitch becomes narrower, the influence of side erasure on an adjacent track (e.g., an abutting track) becomes more likely to be noticeable. It is places where an irregularity in track pitch exists (tracks narrower in track width) that are especially likely to be affected by side erasure. When side erasure occurs, the possibility that the operation of reading data from that adjacent track may result in a read error is higher. Thus, it is desired to manage track-pitch irregularities (tracks narrower in servo track width or data track width than their adjacent tracks).

The track pitch is determined depending on the pitch of servo information recorded onto the magnetic disk 111 during the production process of the magnetic disk device 100. For example, STW (Servo Track Write) attempts to write servo information onto the magnetic disk 111 at a constant feed pitch. Thus, multiple servo areas SV extending radially from around the center of the magnetic disk 111 are defined. The servo areas SV may be placed at equal intervals along a circumferential direction. Servo information including a servo pattern is recorded on the servo area SV.

The servo pattern includes, for example, a servo mark, a grey code, and a burst portion. The servo mark is a reference mark indicating the start of the servo pattern and which is the reference for reading the servo pattern. The grey code includes the track number of a track recorded in digital data. By decoding the track number recorded in a grey code, the magnetic disk device 100 can detect over the track of which track number the read head RH1, RH2 is located. The burst portion is a record area where position information is recorded to detect the offset (direction or amount) from the target position (e.g., the track center) of each track along a radial direction. The magnetic disk device 100 can decode information about the position (offset) of the read head RH1, RH2 relative to the target position for the detected track number, from the amplitude or phase of a signal obtained by reading the position information recorded on the burst portion. That is, by writing the servo information onto the magnetic disk 111, the plurality of concentric circle-shaped tracks are defined, on the magnetic disk 111.

While the STW is writing the servo information onto the magnetic disk 111, unevenness in the track pitch of the servo information may occur due to an error factor such as unstable rotation of the VCM 116, how a pin abuts the magnetic disk 111 in the STW (such as the angle at which a pin for displacing the magnetic head 122 abuts the magnetic head 122), or the ambient environment (vibration or impact). If the error factor becomes large, non-negligible track-pitch irregularities (servo-track-pitch irregularities) may occur.

The method which performs a test (first test) of, after writing data onto tracks under conditions in which side erasure is likely to occur, reading the data can be thought of for the purpose of detecting track-pitch irregularities. Specifically, after writing data onto even-numbered tracks, data is written onto odd-numbered tracks. Then the data is read from the even-numbered tracks to check whether the data was read correctly. In this case, read errors are likely to occur with tracks (some of the even-numbered tracks) narrower in track pitch than their adjacent tracks because they may be affected by side erasure from tracks on both sides.

Further, conversely, after writing data onto odd-numbered tracks, data is written onto even-numbered tracks. Then the data is read from the odd-numbered tracks to check whether the data was read correctly. In this case, read errors are likely to occur with tracks (some of the odd-numbered tracks) narrower in track pitch than their adjacent tracks because they may be affected by side erasure from tracks on both sides.

Then by performing track slip processing to register tracks with which a read error occurred as not-in-use tracks, the occurrence of read errors due to track-pitch irregularities can be avoided in the actual operation of the magnetic disk device 100.

However, in the case of this method, there is the possibility that false detection or un-detection (missing) may occur depending on the direction of off-track when data was written onto the track. Specifically, for example, while data is being written onto an odd-numbered track, if the magnetic head is of track in a direction going away from one adjacent even-numbered track to write wobbly, then the width of data remaining on the one adjacent even-numbered track becomes larger, so that the data may be able to be read without a read error occurring. That is, because of the wobbling of the magnetic head 122, accuracy in detecting track-pitch irregularities may decrease.

Further, in order to detect track-pitch irregularities, the three-step operation of writing data onto even-numbered (or odd-numbered) tracks, writing data onto odd-numbered (or even-numbered) tracks, and reading data from even-numbered (or odd-numbered) tracks is needed for the tracks. Thus, the time required to detect track-pitch irregularities (servo-track-pitch irregularities) tends toward becoming longer.

Accordingly, in the present embodiment, the magnetic disk device 100 determines the track pitch based on respective position information corresponding to servo signals read by the multiple read heads RH1, RH2 and corresponding to multiple tracks, thereby improving accuracy in detecting track-pitch irregularities and reducing the detection time.

Specifically, the fact that, when the magnetic head 122 is made to be on track, the two read heads RH1, RH2 used as the master and slave heads in the TDMR technique are offset from each other in a cross-track direction is utilized. That is, the controller 130 determines the presence/absence of a track-pitch irregularity based on the difference of the distance (track pitch) between the two tracks from the distance between the read heads RH1 and RH2 along the cross-track direction (see FIG. 3). The difference may be defined as the amount obtained by subtracting the track pitch between the two tracks from the distance between the read heads RH1 and RH2 along the cross-track direction.

Figure 2:
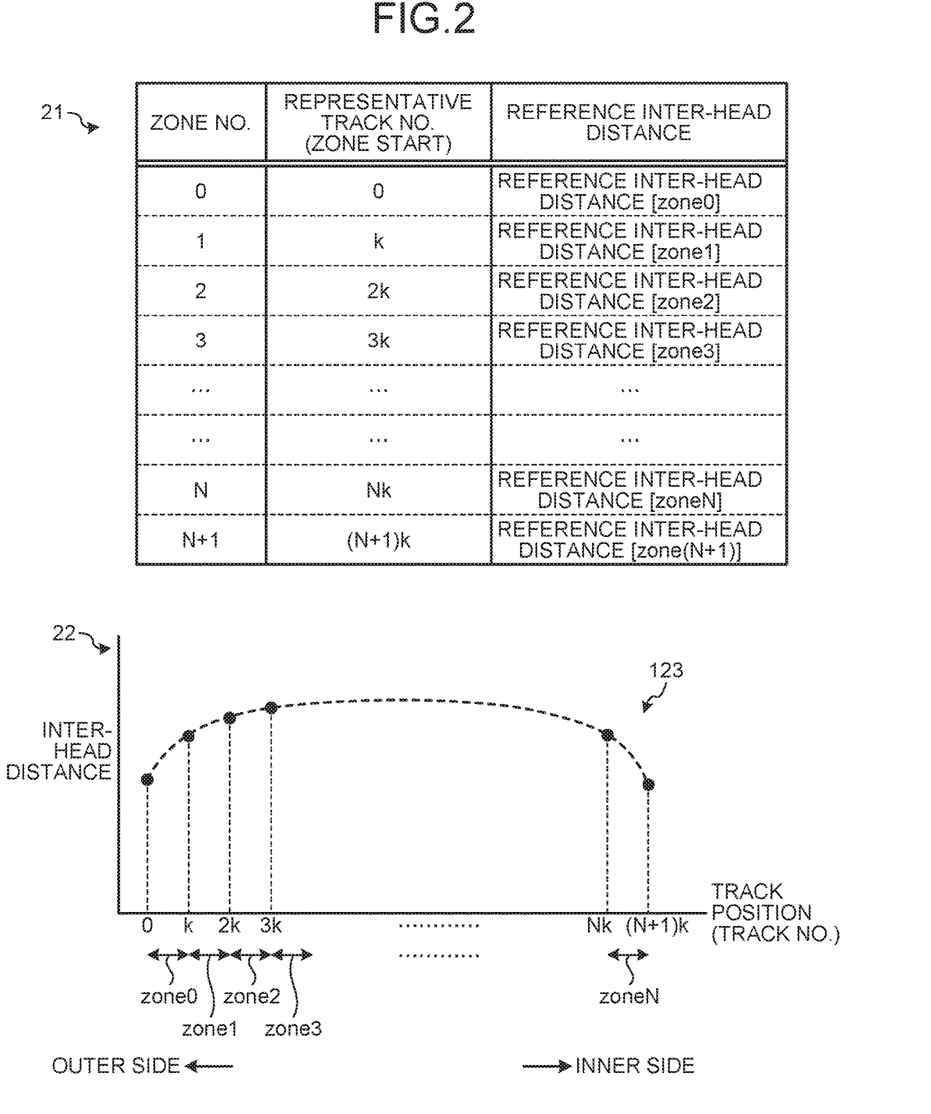
FIG. 2 is a diagram showing inter-head distance management information in the embodiment.

At this time, in order to find track-pitch irregularities accurately, the inter-head distance that is the relative distance between the read heads RH1 and RH2 along the cross-track direction needs to be accurately obtained beforehand. Because the arm angle of the actuator arm 115 varies depending on whether the track is located on the inner side or outer side of the magnetic disk 111, the skew angle of the magnetic head 122 varies. Accordingly, the positional relation of the read heads RH1 and RH2 with the magnetic disk 111 also varies, so that the inter-head distance varies in the proximity of, e.g., one track size. Hence, in the production process of the magnetic disk device 100, a calibration process of calculating the inter-head distance for each track is performed. For example, since the possibility that the inter-head distance may be almost the same between adjacent tracks is high, the inter-head distance of a representative track is measured, for each predefined zone or the like, and the controller 130 obtains reference inter-head distances as shown in 21 of FIG. 2. FIG. 2 is a diagram showing inter-head distance management information 123.

For example, letting Pos[RH1, Trk_0] and Pos[RH2, Trk_0] be respectively the positions (position information) read by the read heads RH1 and RH2 from the servo area SV and decoded when the magnetic head 122 is made to be on track for track Trk_0 (track number=0), the following expression 1 holds for the reference inter-head distance [zone0] of zone 0 including track Trk_0 as a representative track.

Reference inter-head distance[zone0]=$Pos[RH1, Trk\_0]-Pos[RH2,Trk\_0]$  Ex. 1

The reference inter-head distance is obtained likewise for the other zones. For example, the following expression 2 holds for the reference inter-head distance [zone1] of zone 1 including track Trk_k as a representative track, where k is an integer of two or greater.

Reference inter-head distance[zone1]=$Pos[RH1, Trk\_k]-Pos[RH2,Trk\_k]$  Ex. 2

It should be noted that, in order to heighten accuracy in measuring the reference inter-head distance, the inter-head distances for tracks before and after a representative track may be measured and averaged to obtain the reference inter-head distance. That is, letting p be an integer smaller than k, the following expression 3 holds for the reference inter-head distance [zone1] of zone 1 including track Trk_k as a representative track.

Reference inter-head distance[zone1]=$\{(Pos[RH1, Trk\_(k-p)]-Pos[RH2,Trk\_(k-p)])+(Pos[RH1, Trk\_(k-p+1)]-Pos[RH2,Trk\_(k-p+1)])+ \ldots + (Pos[RH1,Trk\_(k-1)]-Pos[RH2,Trk\_(k-1)])+ (Pos[RH1,Trk\_k]-Pos[RH2,Trk\_k])+(Pos[RH1, Trk\_(k+1)]-Pos[RH2,Trk\_(k+1)])+ \ldots +(Pos[RH1,Trk\_(k+p-1)]-Pos[RH2,Trk\_(k+p-1)])+ (Pos[RH1,Trk\_(k+p)]-Pos[RH2,Trk\_(k+p)])\}/(2 \times p)$  Ex. 3

Then the controller 130 can calculate the inter-head distance for each track by interpolating between measured inter-head distances of representative tracks with an approximate curve (or straight line) as shown in 22 of FIG. 2. The calculated inter-head distance is an amount denoting how many track sizes the distance between the read heads RH1 and RH2 along the cross-track direction is. The inter-head distance can be calculated to be at a value in the proximity of, e.g., one track size (one correct track width). Information about the calculated inter-head distance for each track is stored in the form of inter-head distance management information 123 as shown in 22 of FIG. 2. The inter-head distance management information 123 is stored into a management information storage area of the magnetic disk 111 before the magnetic disk device 100 is shipped. The controller 130 reads the inter-head distance management information. 123 from the management information storage area of the magnetic disk 111 as needed to know the inter-head distances set during the production process.

Figure 3:
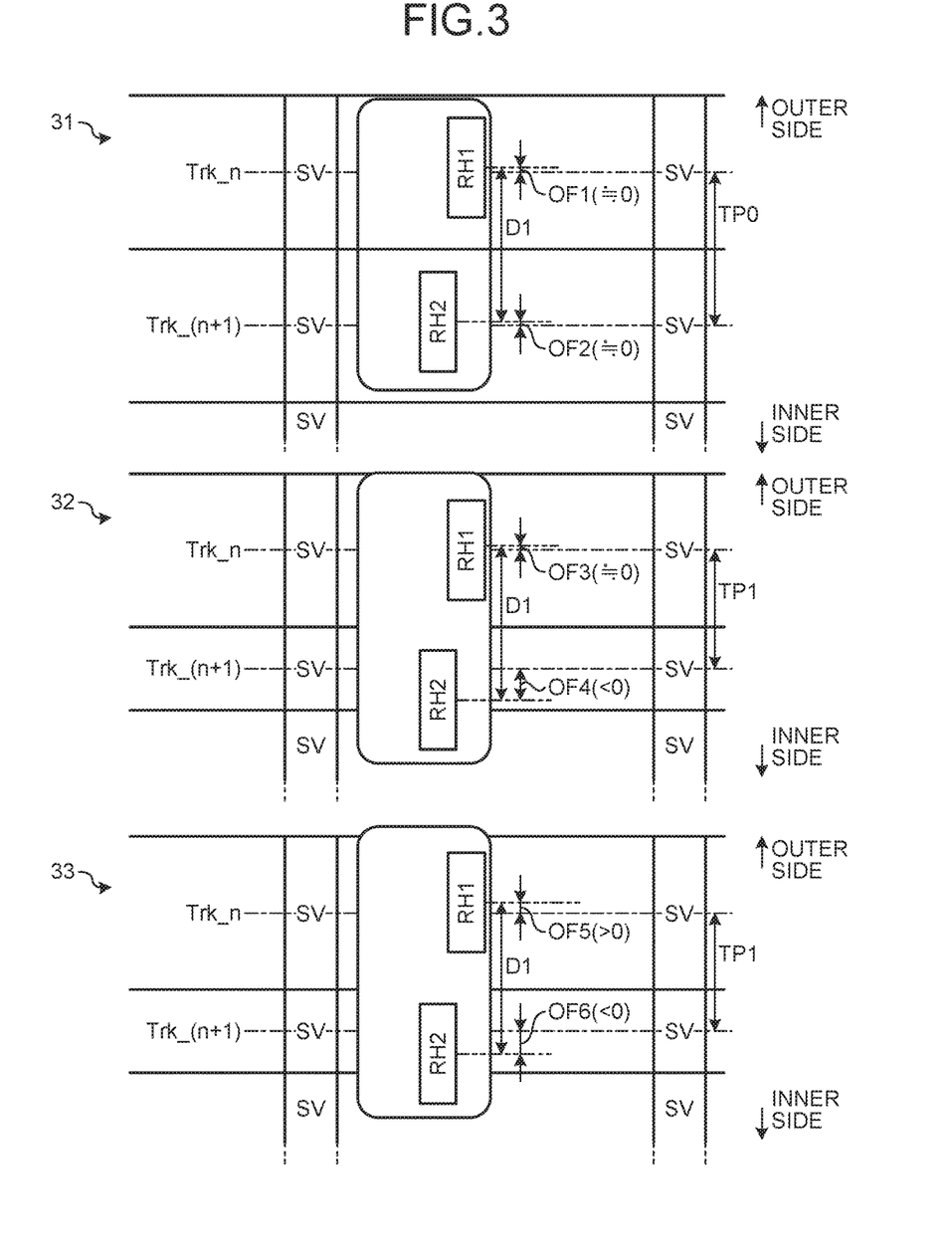
FIG. 3 is a diagram showing a way of obtaining a difference of the track pitch from the inter-head distance in the embodiment.

For example, as shown in FIG. 3, track-pitch irregularities are detected according to the difference of the track pitch from the inter-head distance. FIG. 3 is a diagram showing a way of obtaining a difference of the track pitch from the inter-head distance.

31 of FIG. 3 shows the case where the track widths of tracks Trk_n, Trk_(n+1) are correct and where the track pitch TP0 between tracks Trk_n, Trk_(n+1) is correct. In this case, the controller 130 makes the read head RH1 be on track for track Trk_n and decodes a servo signal (servo signal corresponding to track Trk_n) read by the read head. RH1 from the servo area SV of track Trk_n to obtain the read head RH1 position information PosA=OF1 (≈0). The OF1 is, for example, information indicating the offset position of the read head RH1 offset from the center of track Trk_n along a radial direction. Likewise, the controller 130 decodes a servo signal (servo signal corresponding to track Trk_(n+1)) read by the read head RH2 from the servo area SV of track Trk_(n+1) to obtain the read head RH2 position information PosB=OF2 (≈0). The OFF is, for example, information indicating the offset position of the read head RH2 offset from the center of track Trk_(n+1) along a radial direction.

The absolute values of the offset position information OF1, OF2 indicate by how many track sizes the read head is offset from the center of the track along a radial direction (hereinafter simply called the center of the track), and the signs thereof indicate the direction of the offset from the center of the track. For example, the positive sign may indicate being offset outward from the center of the track, and the negative sign may indicate being offset inward from the center of the track.

Here, letting D1 (=one track size) be the inter-head distance between tracks Trk_n and Trk_(n+1), the controller 130 can obtain the difference ΔTP10 (=D1−TP0) of the track pitch TP0 from the inter-head distance D1 from the following expression 4.

$\Delta TP10 = OF1 - OF2 \approx 0$  Ex. 4

32 of FIG. 3 shows the case where, while the track width of track Trk_n is correct, the track width of track Trk_(n+1) is very narrow and where the track pitch TP1 between tracks Trk_n, Trk_(n+1) is irregular. In this case, the controller 130 makes the read head RH1 be on track for track Trk_n and decodes a servo signal read by the read head RH1 from the servo area SV of track Trk_n to obtain the read head RH1 position information PosA=OF3 (≈0). The OF3 is, for example, information indicating the offset position of the read head RH1 offset from the center of track Trk_n. Likewise, the controller 130 decodes a servo signal read by the read head RH1 from the servo area SV of track Trk_(n+1) to obtain the read head RH2 position information PosB=OF4 (<0). The OF4 is, for example, information indicating the offset position of the read head RH2 offset from the center of track Trk_(n+1).

The absolute values of the offset position information OF3, OF4 indicate by how many track sizes the read head is offset from the center of the track, and the signs thereof indicate the direction of the offset from the center of the track. For example, the positive sign may indicate being offset outward from the center of the track, and the negative sign may indicate being offset inward from the center of the track.

At this time, letting D1 (=one track size) be the inter-head, distance between tracks Trk_n and Trk_(n+1), the controller 130 can obtain the difference ΔTP11 (=D1−TP1) of the track pitch TP1 from the inter-head distance D1 from the following expression 5.

$$\Delta TP11 = OF3 - OF4 > 0 \quad \text{Ex. 5}$$

It should be noted that, in spite of the attempt to make the read head RH1 be on track for track Trk_n, the read head RH1 may deviate from the center of track Trk_n as shown in 33 of FIG. 3 if the magnetic head 122 wobbles due to disturbance such as wind or vibration. For example, 33 of FIG. 3 shows the case where, while the track width of track Trk_n is correct, the track width of track Trk_(n+1) is very narrow and where the track pitch. TP1 between tracks Trk_n, Trk_(n+1) is irregular with the magnetic head 122 wobbling.

At this time, the controller 130 decodes a servo signal read by the read head RH1 from the servo area SV of track Trk_n to obtain the read head RH1 position information PosA=OF5 (>0). The OF5 is, for example, information indicating the offset position of the read head RH1 offset from the center of track Trk_n. Likewise, the controller 130 decodes a servo signal read by the read head RH1 from the servo area SV of track Trk_(n+1) to obtain the read head RH2 position information PosB=OF6 (<0). The OF6 is, for example, information indicating the offset position of the read head RH2 offset from the center of track Trk_(n+1).

The absolute values of the offset position information OF5, OF6 indicate by how many track sizes the read head is offset from the center of the track, and the signs thereof indicate the direction of the offset from the center of the track. For example, the positive sign may indicate being offset outward from the center of the track, and the negative sign may indicate being offset inward from the center of the track.

Here, letting D1 (=one track size) be the inter-head distance between tracks Trk_n and Trk_(n+1), the controller 130 can obtain the difference ΔTP11' (=D1−TP1) of the track pitch TP1 from the inter-head distance D1 from the following expression 6.

$$\Delta TP11' = OF5 - OF6 > 0 \quad \text{Ex. 6}$$

When comparing 32, 33 of FIG. 3, it is seen that the following expression 7 holds.

$$\Delta TP11 \approx \Delta TP11' \quad \text{Ex. 7}$$

As shown in the expressions 4 to 6, the difference of the track pitch from the inter-head distance is a parameter which becomes larger from zero as unevenness in the track pitch becomes larger, and it is seen that it is a parameter useful for detecting irregularities in track pitch unevenness. Further, as shown in the expressions 5 to 7, it is seen that the difference of the track pitch from the inter-head distance is less likely to be affected by the wobbling of the magnetic head 122 due to disturbance.

Hence, the controller 130 determines irregularities in track pitch based on the difference of the track pitch from the inter-head distance. For example, the controller 130 uses the read head RH1 of the magnetic head 122 as a reference head and the read head RH2 as an inspecting head. The controller 130, using the track on the read head RH1 side as a reference track and the track on the read, head RH2 side as an inspection track, determines irregularities in track pitch for the inspection track.

For example, in all the examples shown in 31 to 33 of FIG. 3, the track width of the reference-side track Trk_n is correct. If the track width of the inspection-side track Trk_(n+1) is correct, and the track pitch is correct (i.e., the example of 31 of FIG. 3), then the difference of the track pitch from the inter-head distance is almost zero. If the track width of the inspection-side track Trk_(n+1) is irregular, so that a track pitch irregularity occurs, then the difference of the track pitch from the inter-head distance is larger. That is, as to the value of the difference, a determination value (first threshold), which is a reference with which to determine whether the track pitch is irregular, can be set so as to indicate the boundary between the track pitch being correct and being irregular.

The controller 130 compares the difference of the track pitch from the inter-head distance with the determination value (first threshold) and, if the difference of the track pitch from the inter-head distance exceeds the determination value, determines that the track pitch of track Trk_(n+1) is irregular. If the difference of the track pitch from the inter-head distance is less than the determination value, the controller 130 determines that the track pitch of track Trk_(n+1) is normal. It should be rioted that, if the difference of the track pitch from the inter-head distance is equal to the determination value, the controller 130 can determine that the track pitch of track Trk_(n+1) is irregular, or the controller 130 can determine that the track pitch of track Trk_(n+1) is normal.

It should be noted that, with this determining method, because it is a premise that the track width of the reference-side track is correct, even if the track width of the reference-side track is very narrow, it is formally supposed that the track width is correct. For example, in the case shown in 72 of FIG. 6B, because the track width of the reference-side track Trk_(n+8) is very narrow, it is determined that the track pitch is irregular, although the track width of the inspection-side track Trk_(n+9) is correct. Also in this case, because side erasure of track Trk_(n+8) from track Trk_(n+9) can be prevented by registering track Trk_(n+9) as a not-in-use track, there is no problem with formally supposing that the track width of the reference-side track is correct.

The determination value (first threshold) is a positive value which can be arbitrarily set according to a track pitch management policy. The controller 130 reads the inter-head distance management information 123 (see FIG. 2) from the management information storage area of the magnetic disk 111 and identifies the inter-head distance of the inspection track based on the read inter-head distance management information. 123 and can determine the first threshold to be, e.g., about 10% of the identified inter-head distance.

Figure 4:
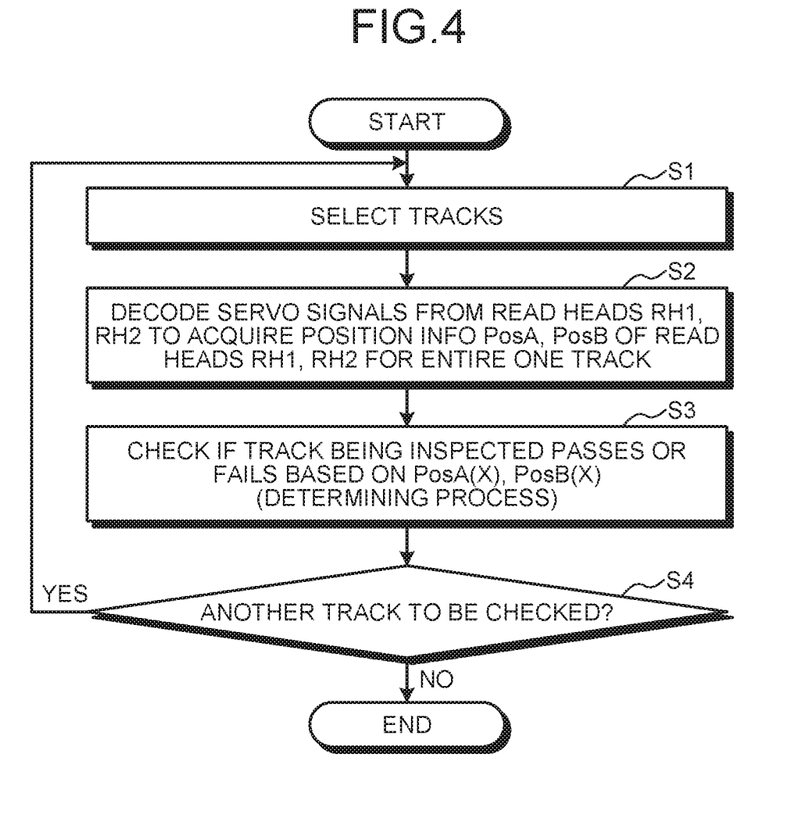
FIG. 4 is a flow chart showing an operation of the magnetic disk device according to the embodiment.
Figure 5:
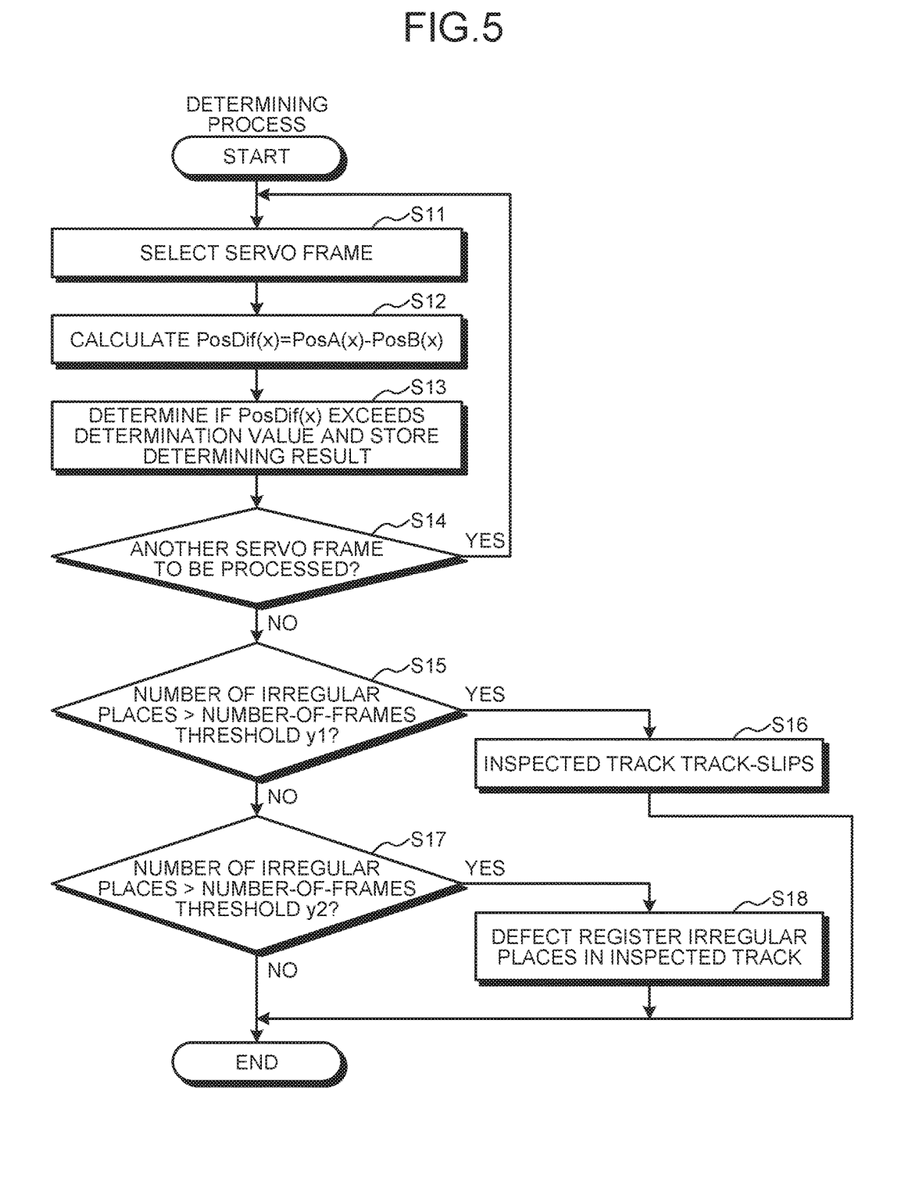
FIG. 5 is a flow chart showing a determining process flow in the embodiment.

The magnetic disk device 100 performs operation as shown in FIGS. 4 and 5 to inspect the multiple tracks on the magnetic disk 111 for irregularities in track pitch. FIG. 4 is a flow chart showing example operation of the magnetic disk device 100. FIG. 5 is a diagram showing an example process flow of determining irregularities in track pitch.

Figure 6A:
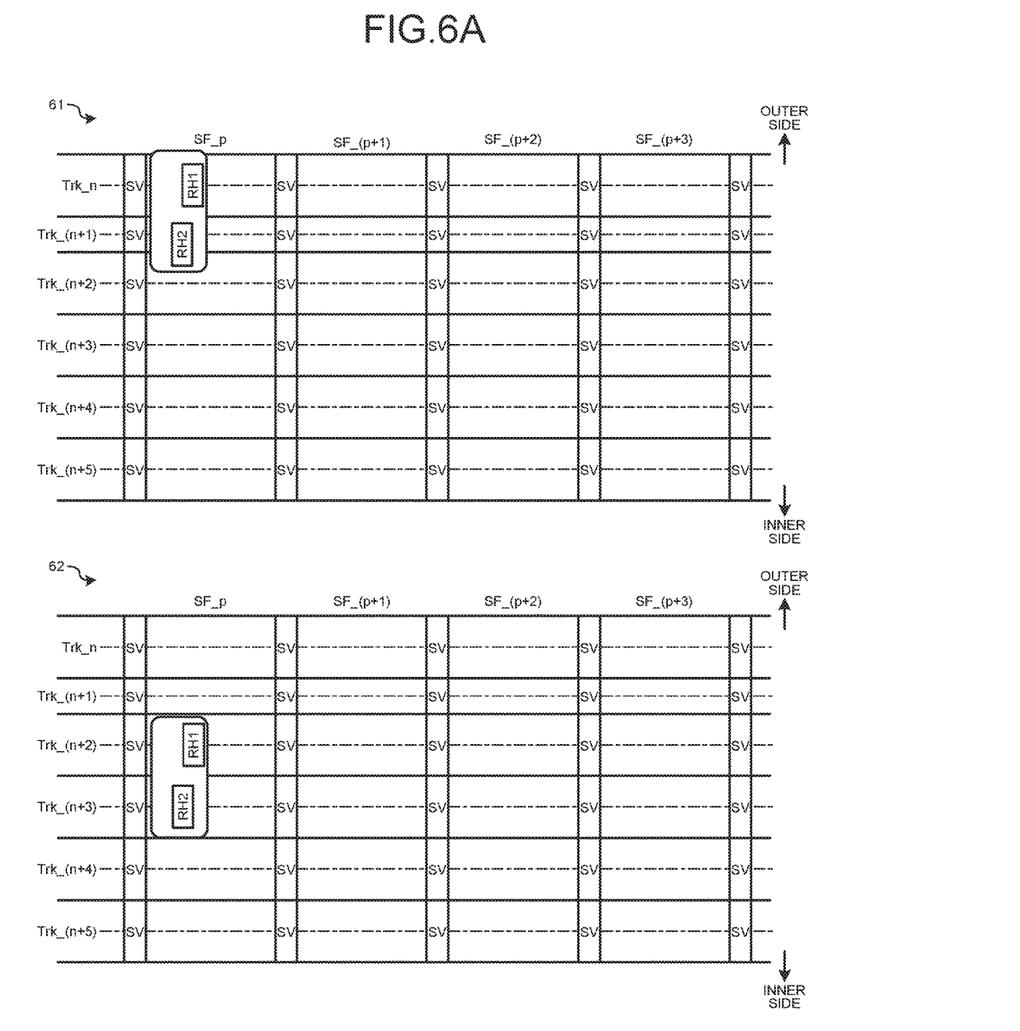
FIG. 6A is a diagram for explaining an example of determining process in the embodiment.
Figure 6B:
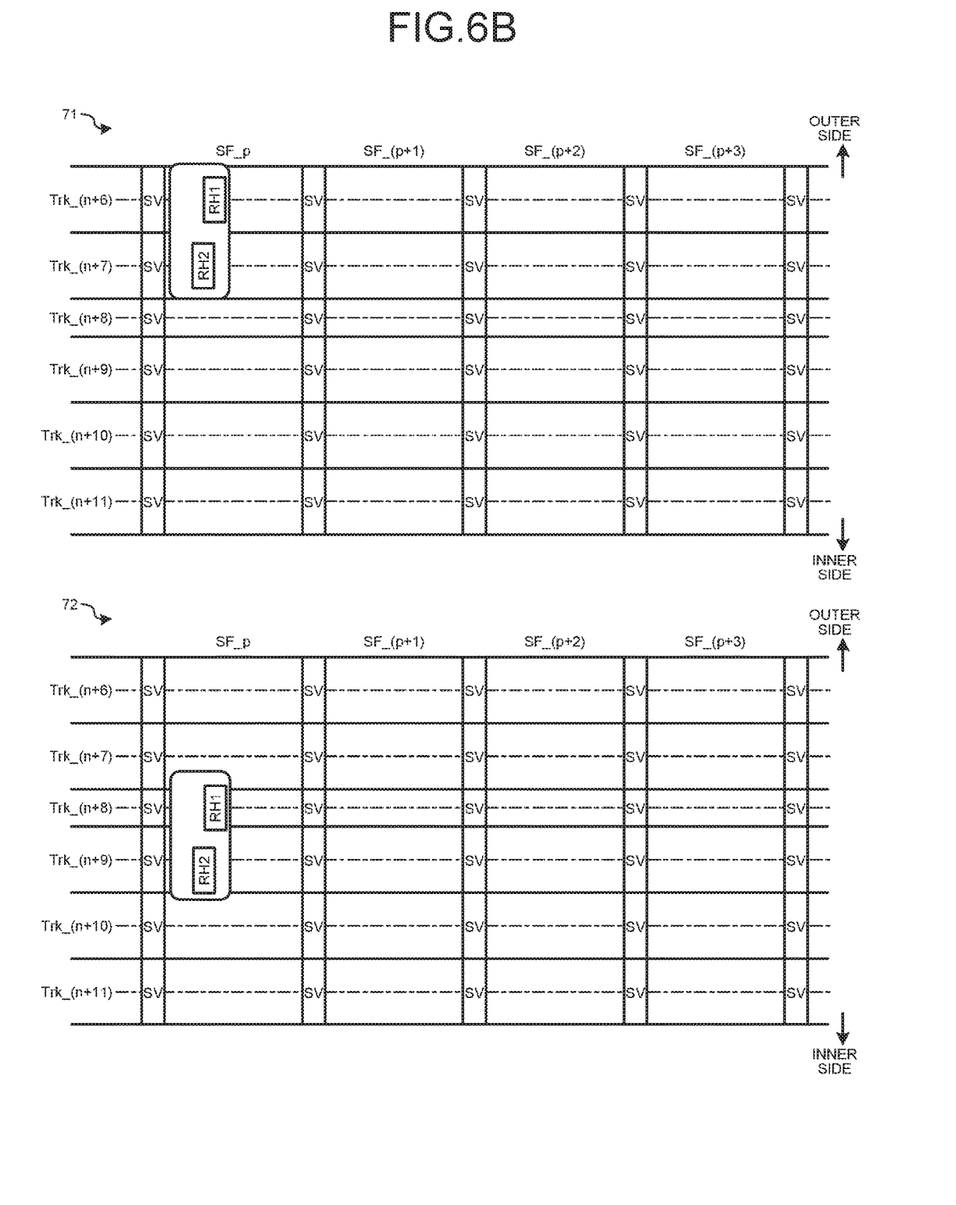
FIG. 6B is a diagram for explaining another example of determining process in the embodiment.

The controller 130 selects a pair of a reference track and an inspection track from among the multiple tracks on the magnetic disk 111 according to a predetermined rule (S1). The predetermined rule may be, for example, to select each two adjacent tracks sequentially while advancing two tracks by two tracks in a first direction on the magnetic disk 111. The first direction can be a direction from the read head RH1 (the reference head) to the read head RH2 (the inspecting head) (a direction from the outer side of the magnetic disk 111 to the inner side in the case of FIG. 3). Letting n be any positive integer, the controller 130 can select track track Trk_(n+1) as a pair of a reference track and an inspection track as shown in 61 of FIG. 6A. Or if track Trk_(n+1) is already inspected, the controller 130 can select track Trk_(n+2), track Trk_(n+3) as a pair of a reference track and an inspection track as shown in 62 of FIG. 6A. Or if track Trk_(n+5) is already inspected, the controller 130 can select track Trk_(n+6), track Trk_(n+7) as a pair of a reference track and an inspection track as shown in 71 of FIG. 6B. Or if track Trk_(n+7) is already inspected, the controller 130 can select track Trk_(n+8) track Trk_(n+9) as a pair of a reference track and an inspection track as shown in 72 of FIG. 6B. FIGS. 6A, 6B are diagrams for explaining the determining process.

The controller 130 makes the read head RH1 be on track for the reference track and acquires servo signals read by the read heads RH1, RH2 from the servo areas SV of the reference track and the inspection track. For example, in the case of 61 of FIG. 6A, the controller 130 makes the read head RH1 be on track for track Trk_n and acquires servo signals read by the read heads RH1, RH2 from the servo areas SV of tracks Trk_n, Trk_(n+1) respectively. In the case of 62 of FIG. 6A, the controller 130 makes the read head RH1 be on track for track Trk_(n+2) and acquires servo signals read by the read heads RH1, RH2 from the servo areas SV of tracks Trk_(n+2), Trk_(n+3) respectively. In the case of 71 of FIG. 6B, the controller 130 makes the read head RH1 be on track for track Trk_(n+6) and acquires servo signals read by the read heads RH1, RH2 from the servo areas SV of tracks Trk_(n+6), Trk_(n+7) respectively. In the case of 72 of FIG. 6B, the controller 130 makes the read head RH1 be on track for track Trk_(n+8) and acquires servo signals read by the read heads RH1, RH2 from the servo areas SV of tracks Trk_(n+8), Trk_(n+9) respectively.

The controller 130 (RWC 125) comprises a circuit to process the servo signals from the read heads RH1, RH2 in parallel. The controller 130 decodes the servo signals from the read heads RH1, RH2 to acquire the position information PosA, PosB of the read heads RH1, RH2 respectively for the entire one track (S2).

In each one track, servo areas SV and servo frames are alternately arranged. The servo frame is an area sandwiched between two servo areas SV adjacent along a circumferential direction in the track. A servo frame number is assigned to each servo frame. Let SF_x denote the xth servo frame, where x is any natural number. Further, let PosA(x), PosB(x) denote the position information of the read heads RH1, RH2 for servo frame SF_x. For example, where K servo frames exist in one track, the controller 130 acquires the position information PosA(1), PosB(1), PosA(2), PosB(2), . . . , PosA(K), PosB(K) of the read heads RH1, RH2.

The controller 130 performs the determining process to check whether the inspection track passes or fails in the presence/absence of track-pitch irregularities based on the position information PosA (x), PosB (x) of the read heads RH1, RH2 (S3). The controller 130 determines the presence/absence of a track-pitch irregularity for the servo frames SF_1, SF_2, . . . , SF_K of the inspection track.

When the determining process (S3) finishes, the controller 130 determines whether to inspect another track (S4). If another track is to be inspected (Yes at S4), the controller 130 makes the process return to S1, and, if a track to be inspected does not exist (No at S4), finishes the inspection.

In the determining process (S3) shown in FIG. 4, the process shown in FIG. 5 is performed. The controller 130 selects a servo frame SF_x subject to determination (S11). For example, the controller 130 selects a not-yet-selected servo frame SF_x from among the servo frames SF_1 to SF_K. The controller 130 calculates the difference between the read head RH1 position information. PosA(x) and the read head RH2 position information PosB(x), PosDif (x)=PosA(x) PosB(x), for the servo frame SF_x subject to determination (S12).

The controller 130 compares the difference PosDif (x) with the determination value (first threshold). If the difference PosDif(x) exceeds the determination value, the controller 130 determines that the track pitch is irregular, and, if the difference PosDif(x) is less than the determination value, determines that the track pitch is normal. It should be noted that, if the PosDif(x) is equal to the determination value, the controller 130 can determine that the track pitch is irregular, or the controller 130 can determine that the track pitch is normal. The controller 130 stores the determining result in association with the identifier (number) of the servo frame SF_x (S13).

Figure 6C:
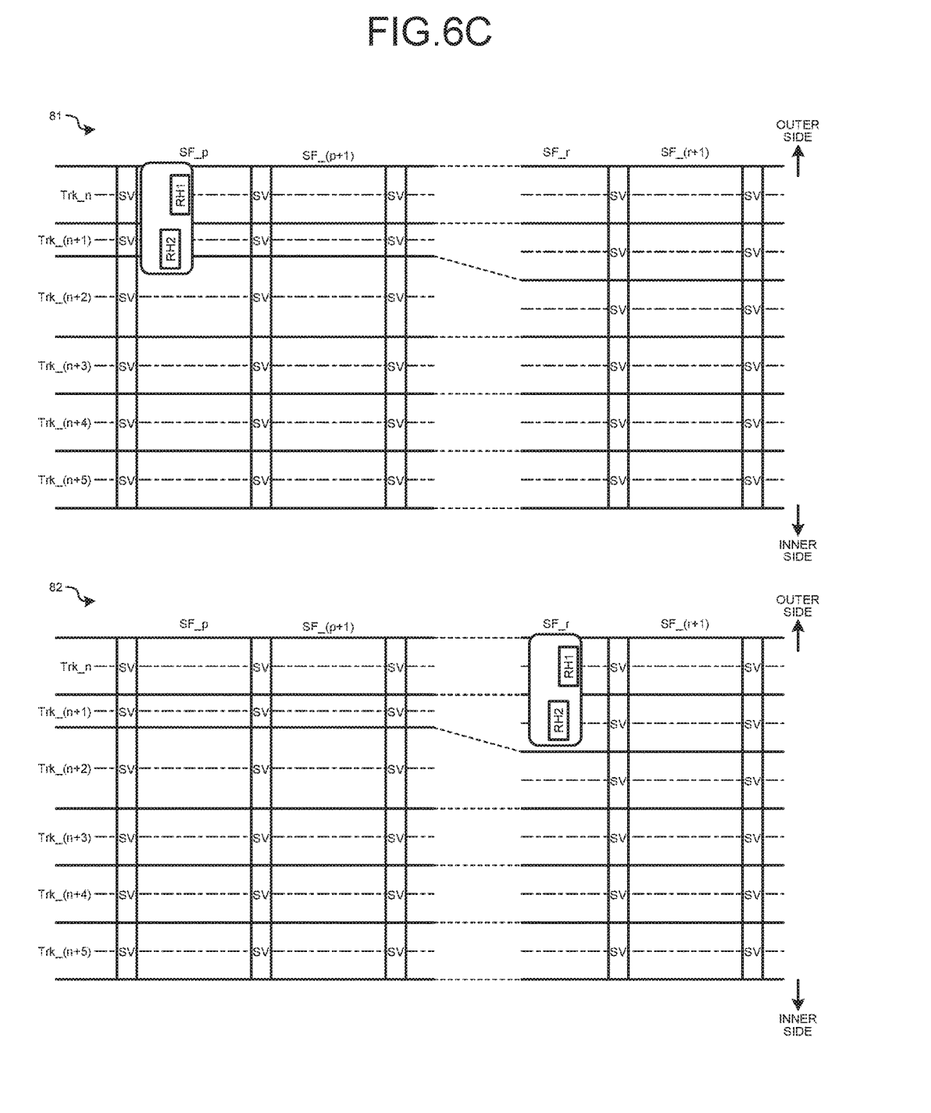
FIG. 6C is a diagram for explaining yet another example of determining process in the embodiment.

For example, in the examples shown in 61 of FIG. 6A, 72 of FIG. 6B, and 81 of FIG. 6C, when comparing the difference PosDif (p) of the servo frame SF_p with the determination value, the controller 130 determines that the track pitch is irregular (NG) because the difference PosDif (p) exceeds the determination value. The controller 130 holds the determining result "NG" in association with the identifier (p) of the servo frame SF_p. FIG. 6C is a diagram for explaining the determining process.

For example, in the examples shown in 62 of FIG. 6A, 71 of FIG. 6B, and 82 of FIG. 6C, when comparing the difference PosDif(p) of the servo frame SF_p with the determination value, the controller 130 determines that the track pitch is normal (OK) because the difference PosDif(p) is less than the determination value. The controller 130 holds the determining result. "OK" in association with the identifier (p) of the servo frame SF_p.

It should be noted that the determination value (first threshold) is a positive value which can be arbitrarily set according to the track pitch management policy. The controller 130 reads the inter-head distance management information 123 (see FIG. 2) from the management information storage area of the magnetic disk 111 and identifies the inter-head distance of the inspection track based on the read inter-head distance management information 123 and can determine the first threshold to be e.g., about 10% of the identified inter-head distance.

The controller 130 determines whether to perform the process on another servo frame (S14). If a not-yet-selected servo frame SF_x exists among the servo frames SF_1 to SF_K (Yes at S14), the controller 130 makes the process return to S11.

If a not-yet-selected servo frame SF_x does not exist (No at S14), the controller 130 compares the number of servo frames SF_x whose determining results are "NG" from among the servo frames SF_1 to SF_K with a number-of-frames threshold (second threshold) y1. That is, the controller 130 determines whether the number of places whose track pitches were determined to be irregular exceeds the number-of-frames threshold y1 (S15).

The number-of-frames threshold y1 corresponds to the upper limit of the permissible number of irregular places in a track. The number-of-frames threshold y1 can be experimentally determined to be the number of irregular places with which the time required for the controller 130 to find normal places rejecting irregular places in one track exceeds required time.

If the number of places whose track pitches were determined to be irregular exceeds the number-of-frames threshold y1 (Yes at S15), the controller 130 determines that there are many track-pitch irregular places in the inspection track and performs track-slip processing to register the inspection track as a not-in-use track in irregular-track management information (S16) and finishes the process. The irregular-track management information includes track identifiers (track numbers). The irregular-track management information is stored into the management information storage area of the magnetic disk 111. Thereafter, control is performed according to the irregular-track management information such that the magnetic head 122 does not access the track registered as a not-in-use track.

For example, in the case shown in 61 of FIG. 6A, if the number of servo frames SF_x whose determining results are "NG", in track Trk_(n+1), exceeds the number-of-frames threshold y1, the controller 130 registers track Trk_(n+1) as a not-in-use track. Thus, during the actual operation of the magnetic disk device 100, access to track Trk_(n+1) can be skipped to avoid slowing data transfer speed due to access to track Trk_(n+1).

For example, in the case shown in 72 of FIG. 6B, if the number of servo frames SF_H whose determining results are "NG", in track Trk_(n+9), exceeds the number-of-frames threshold y1, the controller 130 registers track Trk_(n+9) as a not-in-use track. It is track Trk_(n+8) that is narrower in track width while the track width of track Trk_(n+9) is correct, but side erasure of track Trk_(n+8) from track Trk_(n+9) can be prevented by registering track Trk_(n+9) as a not-in-use track. Further, during the actual operation of the magnetic disk device 100, access to track Trk_(n+9) can be skipped to avoid slowing data transfer speed due to access to track Trk_(n+9).

If the number of places whose track pitches were determined to be irregular is less than or equal to the number-of-frames threshold y1 (No at S15), the controller 130 compares the number of places whose track pitches were determined to be irregular with a number-of-frames threshold (third threshold) y2. That is, the controller 130 determines whether the number of places whose track pitches were determined to be irregular exceeds the number-of-frames threshold y2 (S17). The number-of-frames threshold y2 is less than the number-of-frames threshold y1.

Here, even if the number of places whose track pitches were determined to be irregular is within a permissible range, during the actual operation of the magnetic disk device 100, when an irregular place in the track is accessed, a read error may occur. Meanwhile, where irregular places are registered in irregular-place management information, the irregular-place management information is stored in the management information storage area of the magnetic disk 111. Because the resource of the management information storage area is limited, it is required to suppress registering irregular places in the irregular-place management information (defect registration) to the minimum necessary. Accordingly, the number of irregular places corresponding to the permissible upper limit of the occurrence frequency of read errors may be set as the number-of-frames threshold y2, which is the lower limit of the number of irregular places to be registered in the irregular-place management information.

If the number of places whose track pitches were determined to be irregular exceeds the number-of-frames threshold y2 (Yes at S17), the controller 130 determines that the occurrence of a read error should be prevented and registers the identifiers (numbers) of servo frames SF_x whose determining results are "NG" in the irregular-place management information (defect registration) (S18) to finish the process. The irregular-place management information includes the identifier (track number) of the track associated with irregular-place identifiers (servo frame numbers). The irregular-place management information is stored into the management information storage area of the magnetic disk 111 or the nonvolatile memory 128. Thereafter, while accessing that track, the controller 130 controls the magnetic head 122 not to access the servo frames registered as irregular places according to the irregular-place management information.

If the number of places whose track pitches were determined to be irregular is less than or equal to the number-of-frames threshold y2 (No at S17), the controller 130 determines that defect registration is not needed and finishes the determining process.

Note that the magnetic disk device 100 can perform the operation as shown in FIGS. 4 and 5 in the background in parallel with write or read processing. For example, because track pitch detection and registration can be performed for the inspection track in parallel with writing/reading data onto/from the reference track, a track-pitch irregularity detection test can be performed efficiently.

As described above, in the embodiment, the controller 130 determines the track pitch based on position information corresponding to servo signals read by the multiple read heads RH1, RH2 from servo areas SV of multiple tracks. For example, the controller 130 obtains the difference of the track pitch between the reference track and the inspection track from the distance between the read heads RH1 and RH2 along the cross-track direction based on position information of the read head RH1 and position information of the read head RH2 and, if the difference exceeds a determination value, determines that the track pitch is irregular. Thus, when attempting to make the read head RH1 be on track for the reference track, the controller 130 can obtain the same determining result between the case where there is no wobbling of the magnetic head 122 (e.g., the case of 32 of FIG. 3) and the case where the magnetic head 122 wobbles due to disturbance (e.g., the case of 33 of FIG. 3). That is, the influence of the wobbling of the magnetic head 122 due to disturbance can be reduced in track-pitch irregularity detection, so that accuracy in detecting track-pitch irregularities (servo-track-pitch irregularities) can be improved.

Further, in the embodiment, the controller 130 determines the track pitch based on position information corresponding to servo signals read by the multiple read heads RH1, RH2 from servo areas SV of multiple tracks without a need to write data onto the inspection track. Thus, because track-pitch irregularities can be detected by performing a one-step operation of reading servo signals by the read heads RH1, RH2, the time required to detect track-pitch irregularities (servo-track-pitch irregularities) can be easily shortened.

Yet further, in the embodiment, the controller 130 determines the track pitch for multiple places of the inspection track and, if the number of places whose track pitches were determined to be irregular from among the multiple places exceeds the number-of-frames threshold y1, registers the inspection track as a not-in-use track in the irregular-track management information. Thus, during the actual operation of the magnetic disk device 100, access to that track can be skipped to avoid slowing data transfer speed due to access to that track.

Still further, in the embodiment, if the number of places which were determined to be irregular in the inspection track is less than or equal to the number-of-frames threshold y1 and exceeds the number-of-frames threshold y2, registers the places (servo frames) which were determined to be irregular as irregular places in the irregular-place management information. Thus, during the actual operation of the magnetic disk device 100, the occurrence of a read error due to a track-pitch irregularity of that track can be avoided.

It should be noted that the concept of the present embodiment can also be applied to the case where the deviation of the reference head (read head RH1) and the inspecting head (read head RH2) along the cross-track direction when on track, is larger than one track size.

Or the predetermined, rule used in S1 of FIG. 4 may be to select each two adjacent tracks sequentially while advancing two tracks by two tracks in a second direction on the magnetic disk 111. The second direction can be a direction from the read head RH2 (the inspecting head) to the read head RH1 (the reference head) (a direction from the inner side of the magnetic disk 111 to the outer side in the case of FIG. 3). For example, in S1 of FIG. 4, tracks shown in FIGS. 6A and 6B can be selected in the order of: track Trk_(n+10), track Trk_(n+11)→track Trk_(n+8), track Trk_(n+9)→track Trk_(n+6), track Trk_(n+7)→track Trk_(n+4), track Trk_(n+5)→track Trk_(n+2), track Trk_(n+3)→track Trk_n, track Trk_(n+1).

Or the magnetic disk device 100 may use the read head RH1 as the inspecting head, and the read head RH2 as the reference head and use the track on the read head RH1 side as an inspection track and the track on the read head. RH2 side as a reference track. In this case, not the track on the read head RH2 but the track on the read head RH1 can be registered as a not-in-use track.

For example, in the case shown in 61 of FIG. 6A, if the number of servo frames SF_x whose determining results are "NG", in track Trk_n, exceeds the number-of-frames threshold y1, the controller 130 registers track Trk_n as a not-in-use track. It is track Trk_(n+1) that is narrower in track width while the track width of track Trk_n is correct, but side erasure of track Trk_(n+1) from track Trk_n can be prevented by registering track Trk_n as a not-in-use track. Further, during the actual operation of the magnetic disk device 100, access to track Trk_n can be skipped to avoid slowing data transfer speed due to access to track Trk_n.

For example, in the case shown in 72 of FIG. 6B, if the number of servo frames SF_x whose determining results are "NG", in track Trk_(n+8), exceeds the number-of-frames threshold y1, the controller 130 registers track Trk_(n+8) as a not-in-use track. Thus, during the actual operation of the magnetic disk device 100, access to track Trk_(n+8) can be skipped to avoid slowing data transfer speed due to access to track Trk_(n+8).

Or the method of determining a track-pitch irregularity may be to use a track of which the track width is ascertained to be correct as the reference-side track.

In this case, the read head RH1 may be used as the reference head with the read head RH2 as the inspecting head, and the track on the read head RH1 side may be used as a reference track with the track on the read head RH2 side as an inspection track. The predetermined rule used in S1 of FIG. 4 may be to select each two adjacent tracks sequentially while advancing one track by one track in a first direction on the magnetic disk 111 and not using tracks in which a track-pitch irregularity was detected as reference tracks but skipping them. The first direction can be a direction from the read head RH1 (the reference head) to the read head RH2 (the inspecting head) (a direction from the outer side of the magnetic disk 111 to the inner side in the case of FIG. 3). For example, if a track-pitch irregularity is detected in inspecting track Trk_(n+1) with track Trk_n as the reference track, the controller 130 can select track Trk_(n+2) as a reference track after advancing by one track in the first direction from track Trk_n to track Trk_(n+1) and skipping track Trk_(n+1) to further advance by one track in the first direction. That is, the controller 130 can select tracks Trk_(n+2), Trk_(n+3) as a pair of a reference track and an inspection track as shown in 62 of FIG. 6A. For example, if a track-pitch irregularity is not detected in inspecting track Trk_(n+3) with track Trk_(n+2) as the reference track, the controller 130 can select track Trk_(n+3) as a reference track after advancing by one track in the first direction from track Trk_(n+2). That is, the controller 130 can select tracks Trk_(n+3), Trk_(n+4) as a pair of a reference track and an inspection track, although not shown. That is, in S1 of FIG. 4, tracks shown in FIGS. 6A and 6B can be selected in the order of: track Trk_n, track Trk_(n+1)→"track Trk_(n+1) is not used as a reference track but skipped because a track-pitch irregularity was detected in preceding S13"→track Trk_(n+2), track Trk_(n+3)→track Trk_(n+3), track Trk_(n+4)→track Trk_(n+4), track Trk_(n+5)→track Trk_(n+5), track Trk_(n+6)→track Trk_(n+6), track Trk_(n+7)→track Trk_(n+7), track Trk_(n+8)→"track Trk_(n+8) is not used as a reference track but skipped because a track-pitch irregularity was detected in preceding S13"→track Trk_(n+9), track Trk_(n+10)→track Trk_(n+10), track Trk_(n+11). In S15, if the number of servo frames SF_x whose determining results are "NG", in track Trk_(n+1), exceeds the number-of-frames threshold y1, the controller 130 registers track Trk_(n+1) as a not-in-use track in S16. For example, in S15, if the number of servo frames SF_x whose determining results are "NG", in track Trk_(n+8), exceeds the number-of-frames threshold y1, the controller 130 registers track Trk_(n+8) as a not-in-use track in S16.

Or the read head RH1 may be used as the inspecting head with the read head RH2 as the reference head, and the track on the read head RH1 side may be used as an inspection track with the track on the read head RH2 side as a reference track. The predetermined rule used in S1 of FIG. 4 may be to select each two adjacent tracks sequentially while advancing one track by one track in a second direction on the magnetic disk 111 and not using tracks in which a track-pitch irregularity was detected as reference tracks but skipping them. The second direction can be a direction from the read head RH2 (the reference head) to the read head RH1 (the inspecting head) (a direction from the inner side of the magnetic disk 111 to the outer side in the case of FIG. 3). For example, in S1 of FIG. 4, tracks shown in FIGS. 6A and 6B can be selected in the order of: track Trk_(n+10), track Trk_(n+11)→track Trk_(n+9), track Trk_(n+10)→track Trk_(n+8), track Trk_(n+9)→"track Trk_(n+8) is not used as a reference track but skipped because a track-pitch irregularity was detected in preceding S13"→track Trk_(n+6), track Trk_(n+7)→track Trk_(n+5), track Trk_(n+6)→track Trk_(n+4), track Trk_(n+5)→track Trk_(n+3), track Trk_(n+4)→track Trk_(n+2), track Trk_(n+3)→track Trk_(n+1), track Trk_(n+2)→"track Trk_(n+1) is not used as a reference track but skipped because a track-pitch irregularity was detected in preceding S13"→and track Trk_(n−1), track Trk_n. In S15, if the number of servo frames SF_x whose determining results are "NG", in track Trk_(n+1), exceeds the number-of-frames threshold y1, the controller 130 registers track Trk_(n+1) as a not-in-use track in S16. For example, in S15, if the number of servo frames SF_x whose determining results are "NG", in track Trk_(n+8), exceeds the number-of-frames threshold y1, the controller 130 registers track Trk_(n+8) as a not-in-use track in S16.

In this way, because tracks of which the track width is ascertained to be correct are used as the reference-side tracks, accuracy in detecting track-pitch irregularities can be further improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk;
a magnetic head opposite the magnetic disk and includes a first read head and a second read head; and
a controller that determines a track pitch in a vicinity of a first track or a second track adjacent to the first track of the magnetic disk based on first position information and second position information, the first position information depending on a servo signal read by the first read head and corresponding to the first track, the second position information depending on a servo signal read by the second read head, and corresponding to the second track.

2. The magnetic disk device according to claim 1, wherein the controller obtains a difference of the track pitch between the first and second tracks from a distance between the first and second read heads along a cross-track direction based on the first position information and the second position information and determines the track pitch based on the difference and a first threshold.

3. The magnetic disk device according to claim 2, wherein the first position information includes a first offset position of the first read head offset from a center of the first track,
the second position information includes a second offset position of the second read head offset from a center of the second track, and
wherein the controller obtains the difference from a difference between the first offset position and the second offset position.

4. The magnetic disk device according to claim 3, wherein the first offset position includes an amount by which a position of the first read head is offset from the center of the first track and a direction in which the first read head is offset, and
wherein the second offset position includes an amount by which a position of the second read head is offset from the center of the second track and a direction in which the second read head is offset.

5. The magnetic disk device according to claim 2, wherein if the difference exceeds the first threshold, the controller determines that the track pitch is irregular.

6. The magnetic disk device according to claim 5, wherein the controller determines track pitches for multiple places in the second track and, if the number of places whose track pitches were determined to be irregular among the multiple places exceeds a second threshold, registers the second track as a not-in-use track.

7. The magnetic disk device according to claim 6, wherein the controller selects a third track and a fourth track along a first direction from the first track to the second track along a cross-track direction on the magnetic disk and determines track pitches for multiple places in the fourth track based on third position information corresponding to a servo signal read by the first read head and corresponding to the third track and fourth position information corresponding to a servo signal read by the second read, head and corresponding to the fourth track and, if the number of places whose track pitches were determined to be irregular among the multiple places exceeds the second threshold, registers the fourth track as the not-in-use track.

8. The magnetic disk device according to claim 6, wherein the controller selects the second track and a third track along a first direction from the first track to the second track along a cross-track direction on the magnetic disk and determines track pitches for multiple places in the third track based on fifth position information corresponding to a servo signal read by the first read head and corresponding to the second, track and sixth position information corresponding to a servo signal read by the second read head and corresponding to the third track and, if the number of places whose track pitches were determined to be irregular among the multiple places exceeds the second threshold, registers the third track as the not-in-use track.

9. The magnetic disk device according to claim 6, wherein
if the number of places which were determined to be irregular is less than the second threshold, the controller registers the places which were determined to be irregular as irregular places to avoid accessing in the second track depending on the number of places which were determined to be irregular.

10. The magnetic disk device according to claim 9, wherein
if the number of places which were determined to be irregular is less than the second threshold and exceeds a third threshold less than the second threshold, the controller registers the places which were determined to be irregular as the irregular places.

11. A control method in a magnetic disk device comprising a magnetic disk and a magnetic head opposite the magnetic disk and includes a first read head and a second read head, the method comprising:
acquiring first position information corresponding to a servo signal read by the first read head and corresponding to a first track of the magnetic disk and second position information corresponding to a servo signal read by the second read head and corresponding to a second track adjacent to the first track; and
determining a track pitch in the vicinity of the first track or the second track based on the first position information and the second position information.

12. The control method according to claim 11, wherein the determining includes:
obtaining a difference of the track pitch between the first and second tracks from the distance between the first and second read heads along a cross-track direction based on the first position information and the second, position information; and
determining the track pitch based on the difference and a first threshold.

13. The control method according to claim 12, wherein the first position information includes the first offset position of the first read head offset from a center of the first track,
the second position information includes a second offset position of the second read head offset from a center of the second track, and
wherein obtaining the difference includes obtaining the difference from a difference between the first offset position and the second offset position.

14. The control method according to claim 13, wherein
the first offset position includes an amount by which a position of the first read head is offset from the center of the first track and a direction in which the first read head is offset, and wherein the second offset position includes an amount by which a position of the second read head is offset from the center of the second track and a direction in which the second read head is offset.

15. The control method according to claim 12, wherein the determining includes, if the difference exceeds the first threshold, determining that the track pitch is irregular.

16. The control method according to claim 15, wherein the determining includes:

determining track pitches for multiple places in the second track; and if the number of places whose track pitches were determined to be irregular among the multiple places exceeds a second threshold, registering the second track as a not-in-use track.

17. The control method according to claim 16, further comprising:

selecting a third track and a fourth track along a first direction from the first track to the second track along a cross-track direction on the magnetic disk and acquiring third position information corresponding to a servo signal read by the first read head and corresponding to the third track and fourth position information corresponding to a servo signal read by the second read head and corresponding to the fourth track; and determining track pitches for multiple places in the fourth track based on the third position information and the fourth position information and, if the number of places whose track pitches were determined to be irregular among the multiple places exceeds the second threshold, registering the fourth track as the not-in-use track.

18. The control method according to claim 16, comprising:

selecting the second track and a third track along a first direction from the first track to the second track along a cross-track direction on the magnetic disk and acquiring fifth position information corresponding to a servo signal read by the first read head and corresponding to the second track and sixth position information corresponding to a servo signal read by the second read head and corresponding to the third track; and determining track pitches for multiple places in the third track based on the fifth position information and the sixth position information and, if the number of places whose track pitches were determined to be irregular among the multiple places exceeds the second threshold, registering the third track as the not-in-use track.

19. The control method according to claim 16, wherein the determining includes, if the number of places which were determined to be irregular is less than the second threshold, registering the places which were determined to be irregular as irregular places to avoid accessing in the second track depending on the number of places which were determined to be irregular.

20. The control method according to claim 19, wherein the determining includes, if the number of places which were determined to be irregular is less than the second threshold and exceeds a third threshold less than the second threshold, registering the places which were determined to be irregular as the irregular places.

* * * * *